(12) United States Patent
Kua et al.

(10) Patent No.: US 7,757,582 B2
(45) Date of Patent: Jul. 20, 2010

(54) BICYCLE COMPONENT MOUNTING STRUCTURE

(75) Inventors: Wei Hock Kua, Singapore (SG); Aik Kwang Ng, Singapore (SG)

(73) Assignee: Shimano (Singapore) Pte., Ltd., Jurong Town (SG)

( * ) Notice: Subject to any disclaimer, the term of this patent is extended or adjusted under 35 U.S.C. 154(b) by 716 days.

(21) Appl. No.: 11/641,905

(22) Filed: Dec. 20, 2006

(65) Prior Publication Data

US 2008/0148899 A1 Jun. 26, 2008

(51) Int. Cl.
B62K 21/18 (2006.01)

(52) U.S. Cl. ..................................................... 74/551.8

(58) Field of Classification Search ................ 74/551.8; 403/52, 83, 290, 373, 374.3; 248/313, 230.1
See application file for complete search history.

(56) References Cited

U.S. PATENT DOCUMENTS 2,653,839 A * 9/1953 Middendorf ............. 403/374.3
5,904,442 A * 5/1999 Takeda ....................... 403/392
5,921,139 A 7/1999 Yamane
6,595,894 B2 7/2003 Hanatani
6,718,843 B2 * 4/2004 Campagnolo ............... 74/502.2
6,896,438 B1 * 5/2005 Chen .......................... 403/290
2005/0126329 A1 6/2005 Blaschke
2006/0207375 A1 9/2006 Jordan et al.

FOREIGN PATENT DOCUMENTS

| DE | 296-15-710 U1 | 1/1998 |
| EP | 0-727-334 A1 | 8/1996 |
| EP | 0-984-174 A2 | 3/2000 |
| FR | 435-454 A | 12/1911 |
| GB | 2-278-417 A | 11/1994 |

* cited by examiner

*Primary Examiner*—Vicky A Johnson
(74) *Attorney, Agent, or Firm*—Global IP Counselors, LLP

(57) ABSTRACT

A bicycle component includes a band and a band tightener. The band is configured to at least partially extend around a bicycle frame portion. The band tightener is coupled to the band to tighten the band on the bicycle frame portion such that a portion of the band tightener contacts the bicycle frame portion with the band tightened on the bicycle frame portion.

18 Claims, 5 Drawing Sheets

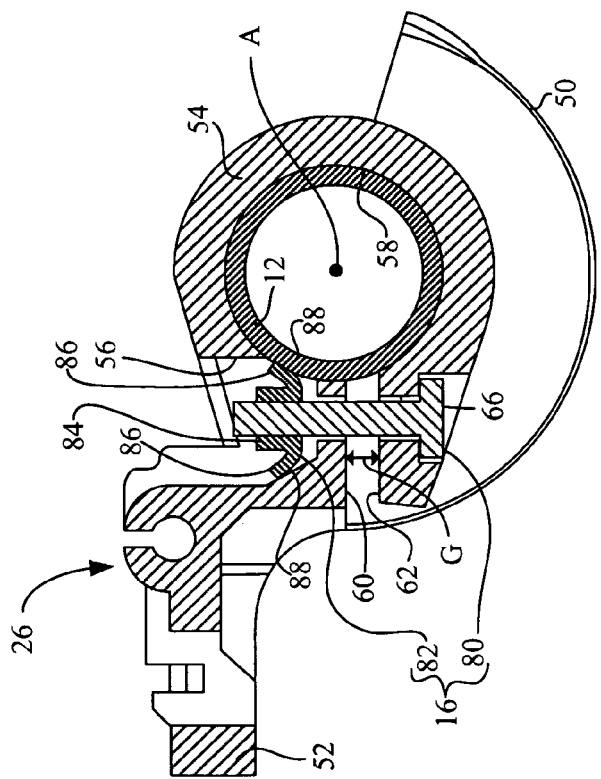
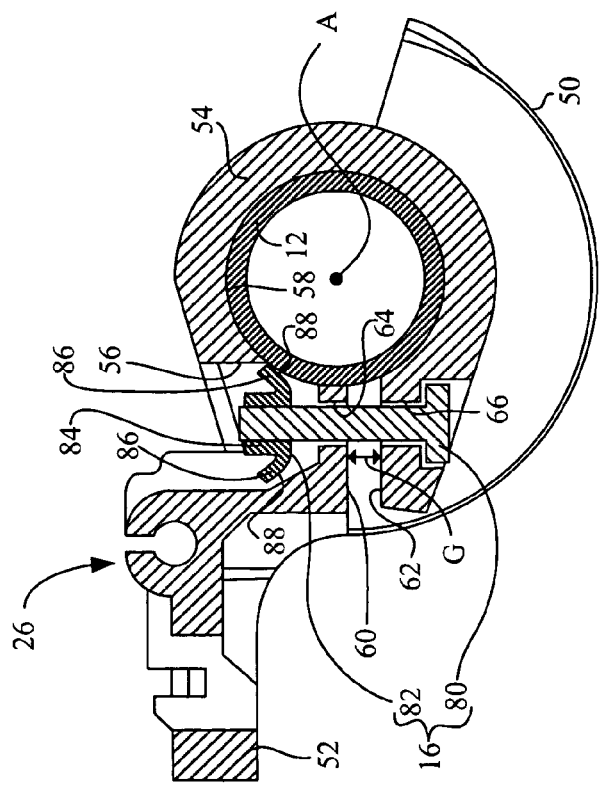
Fig. 4
Fig. 5

BICYCLE COMPONENT MOUNTING STRUCTURE

BACKGROUND OF THE INVENTION

1. Field of the Invention

This invention generally relates to a bicycle component mounting structure. More specifically, the present invention relates to bicycle component mounting structure with a band tightener for securely fixing the bicycle component mounting structure to the handlebar of a bicycle.

1. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Many bicycle components, such as shift control devices, have been extensively redesigned.

There are many different configurations of shift control devices. Some are lever operated and some are grip-type shifters that include a non-rotatable portion (a stationary portion) and a rotatable grip. Grip-type shifters are typically fixed to the bicycle handlebar by a band or similar structure that clamps the non-moving portion of the shift control device to the handlebar. Under certain circumstances, rotation of the rotatable grip the band can cause rotation of the non-moving portion of shift control device relative to the handlebar, especially when the band is made of a plastic material.

Such bands or clamps are used to secure a variety of bicycle components such as brake lever mechanisms and lights to bicycle frame portions. Such bicycle components can also undergo rotation with respect to the bicycle frame portion, resulting in difficult use or operation of that component.

In view of the above, it will be apparent to those skilled in the art from this disclosure that there exists a need for an improved mechanism for securing bicycle components to the handlebar or frame portions of the bicycle. This invention addresses this need in the art as well as other needs, which will become apparent to those skilled in the art from this disclosure.

SUMMARY OF THE INVENTION

One object of the present invention is to provide a shift control device with an attachment mechanism that more securely attaches the shift control device to the handlebar of a bicycle.

Another object of the present invention is to provide a simple mechanism that non-rotatably secures a bicycle component, such as a shift control device, to the handlebar of a bicycle.

The foregoing objects can basically be attained by providing a bicycle component mounting structure that includes a bicycle component, a band and a band tightener. The band is coupled to the component and configured to at least partially extend around a bicycle frame portion. The band tightener is coupled to the band to tighten the band on the bicycle frame portion such that a portion of the band tightener contacts the bicycle frame portion with the band tightened on the bicycle frame portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 4 is a cross-sectional view taken along the line 4-4 in FIG. 2 showing the band tightener in a loose state within the shift control device in accordance with the first embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
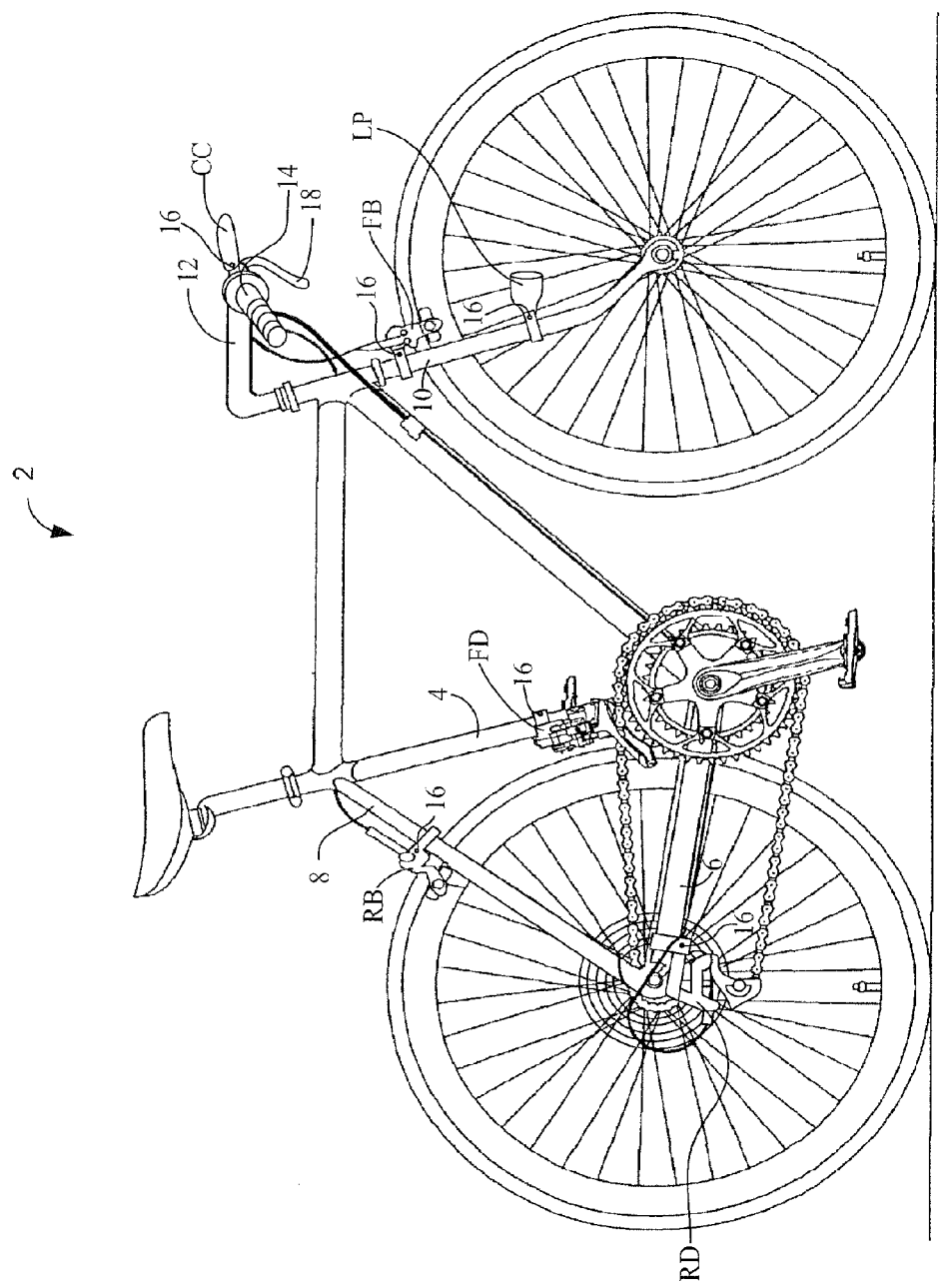
FIG. 1 a side elevational view of a bicycle that includes a handlebar with a shift control device and a brake lever assembly attached thereto in accordance with the present invention.

Referring initially to FIG. 1, a bicycle 2 is illustrated in accordance with a first embodiment of the present invention. The bicycle 2 includes frame elements (bicycle frame portions) such as a seat tube 4, a chain stay 6, a seat stay 8, a front fork 10 and a handlebar 12. The bicycle 2 also includes a plurality of bicycle components such as a rear derailleur RD, a front derailleur FD, a rear brake mechanism RB, a front brake mechanism FB, a shift control device 14, a lamp LP, a cycle computer CC and a brake lever assembly 18. As shown in FIG. 1, the front derailleur FD is attached to the seat tube 4, the rear derailleur RD is attached to the chain stay 6, the rear brake mechanism RB is attached to the seat stay 8, the front brake mechanism FB and the lamp LP are attached to the front fork 10, and the shift control device 14, the brake lever assembly 18 and the cycle computer CC are secured to the handlebar 12.

Each of the bicycle components, the front derailleur FD, the rear derailleur RD, the rear brake mechanism RB, the front brake mechanism FB, the shift control device 14 and the brake lever mechanism 18 are secured in place by separate band tighteners 16 of the present invention as shown in FIGS. 3, 4, 5 and 6 and described in greater detail below along with, for example, the shift control device 14.

Figure 2:
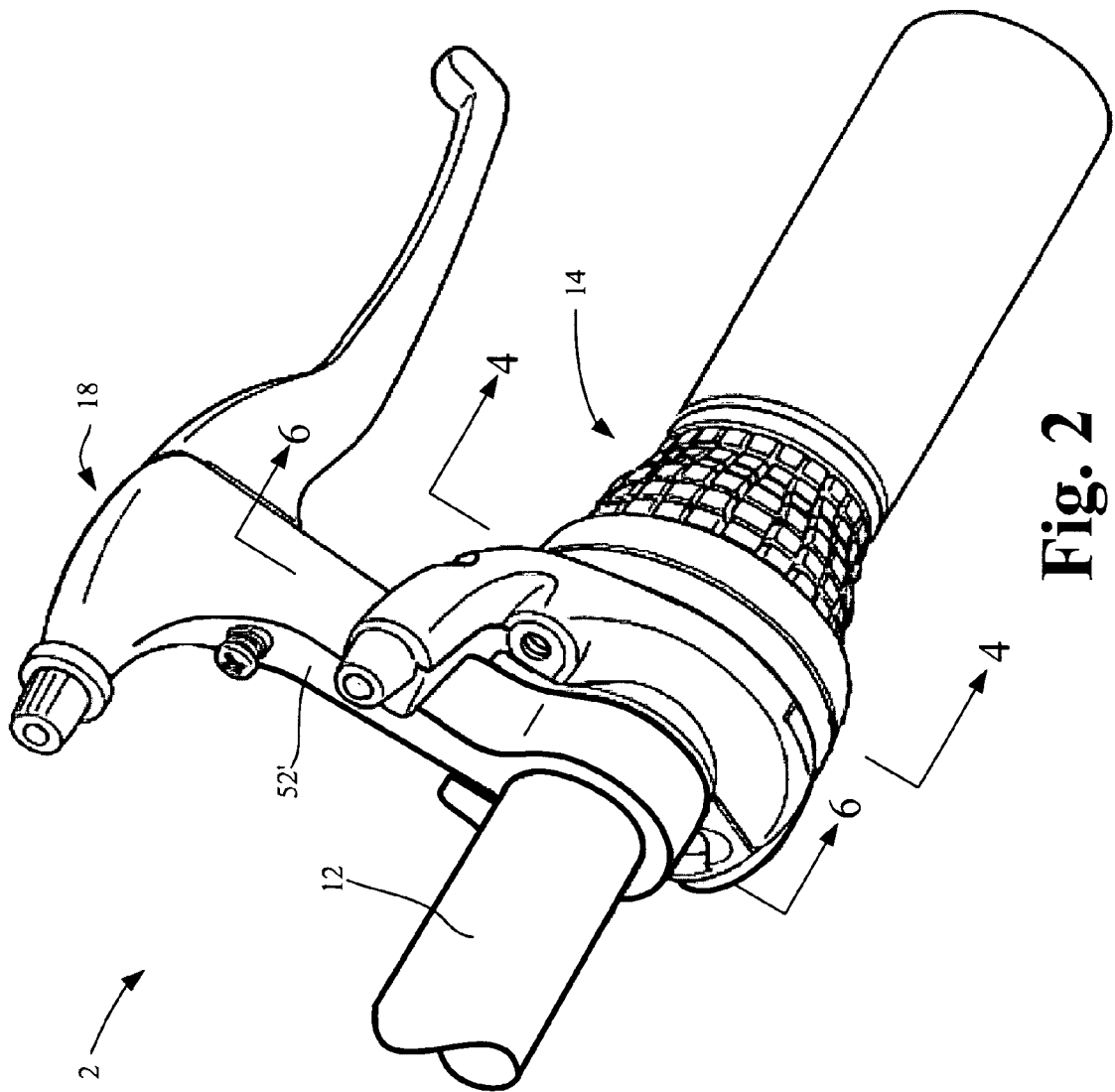
FIG. 2 is a perspective view of the handlebar of the bicycle showing the shift control device and the brake actuation device in accordance with the present invention.

As shown in FIG. 2, the shift control device 14 is secured to the handlebar 12 adjacent to the brake lever assembly 18. It should be understood from the description and drawings that the brake lever assembly 18 is a separate mechanism from the shift control device 14. Alternatively, the brake lever assembly 18 can be integrated into the shift control device 14 such that the brake lever assembly 18 and the shift control device 14 are attached to the handlebar 12 as a single component.

Figure 3:
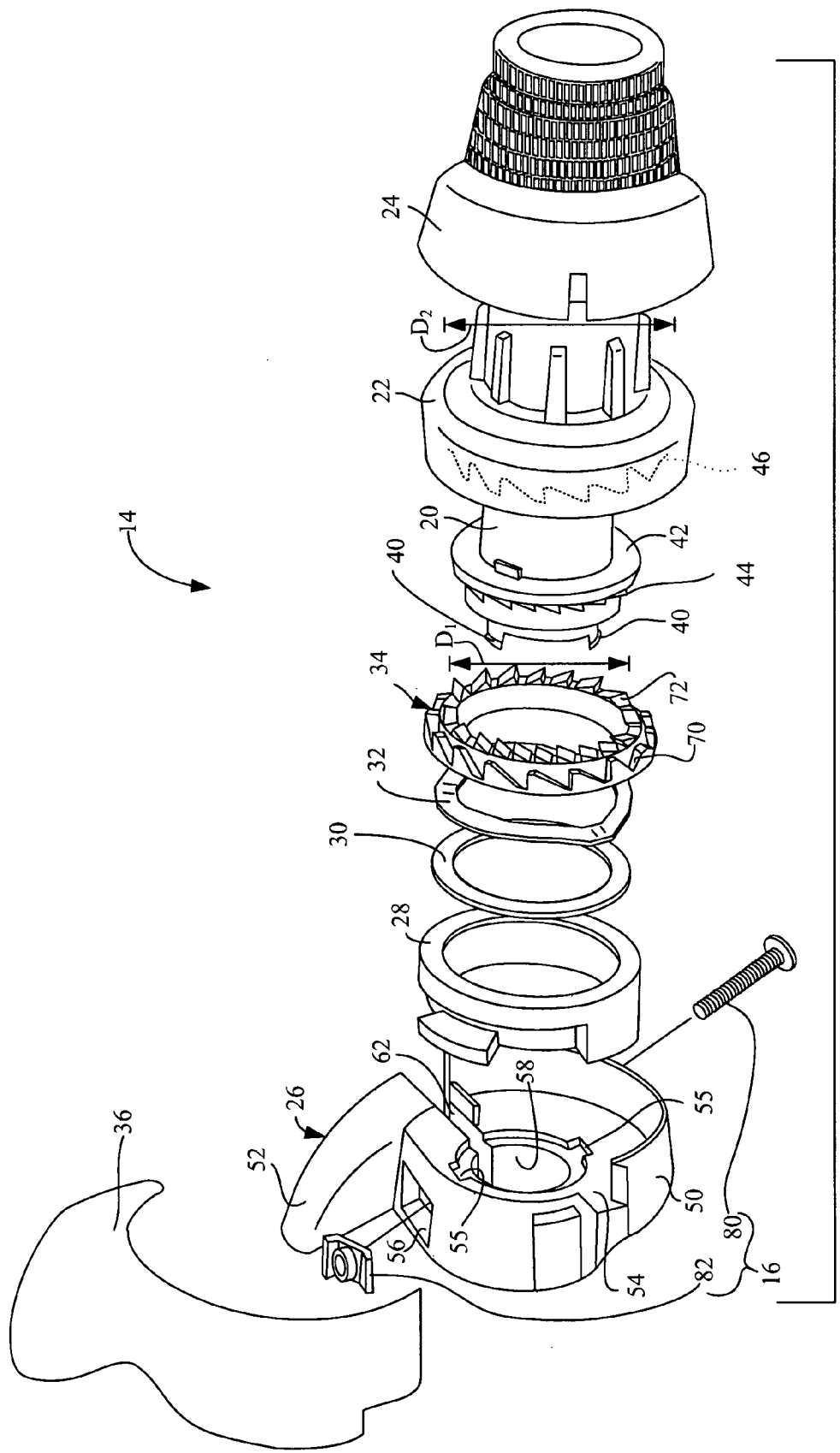
FIG. 3 is an exploded perspective view of the shift control device removed from the handlebar showing elements of a shift control mechanism and a band tightener in accordance with a first embodiment of the present invention.

With reference now to FIG. 3, a description of the band tightener 16 along with one of the bicycle components is now provided. Specifically, the band tightener 16 is now described for use in attaching the shift control device 14 to the handle bar 12.

The shift control device 14 basically includes a base member 20, a rotatable member 22 (a movable portion), a grip member 24, a band portion 26, a cable take-up member 28, a washer 30, a spring washer 32, an idler 34, a cover 36 and the band tightener 16. The base member 20, the rotatable member 22, the grip member 24, the cable take-up member 28, the washer 30, the spring washer 32 and the idler 34 generally define a shift control mechanism.

The base member 20 has a cylindrically shaped central section that slides on to the handlebar 12. The base member 20 includes a pair of projections 40, an annular projection 42 and gear teeth 44 that are formed on an axial end face of the annular projection 42. The gear teeth 44 have a pitch diameter $D_1$. The base member 20 is preferably made of a durable, rigid plastic or polymer material but can alternatively be made of metal or composite materials.

The rotatable member 22 (a movable portion) is rotatably retained on the base member 20 has a cup-like shape. The rotatable member 22 is formed with hidden gear teeth 46 having a pitch diameter $D_2$. The rotatable member 22 is preferably made of a durable, rigid plastic or polymer material but can alternatively be made of metal or composite materials. The pitch diameter $D_2$ is larger than the pitch diameter $D_1$.

The grip member 24 is preferably made of a flexible rubber, plastic or polymer material and is configured to fit over the rotatable member 22 to provide an attractive appearance and provide a gripping surface. The grip member 24 is further configured to grip and engage an outer surface of the rotatable member 22 such that the grip member 24 and the rotatable member 22 are interlocked with one another for rotation together in a conventional manner. Specifically, the grip member 24 and the rotatable member 22 (the movable portion) are configured for controlling gear shifting of the shift control mechanism of the shift control device 14 in a conventional manner.

Figure 5:
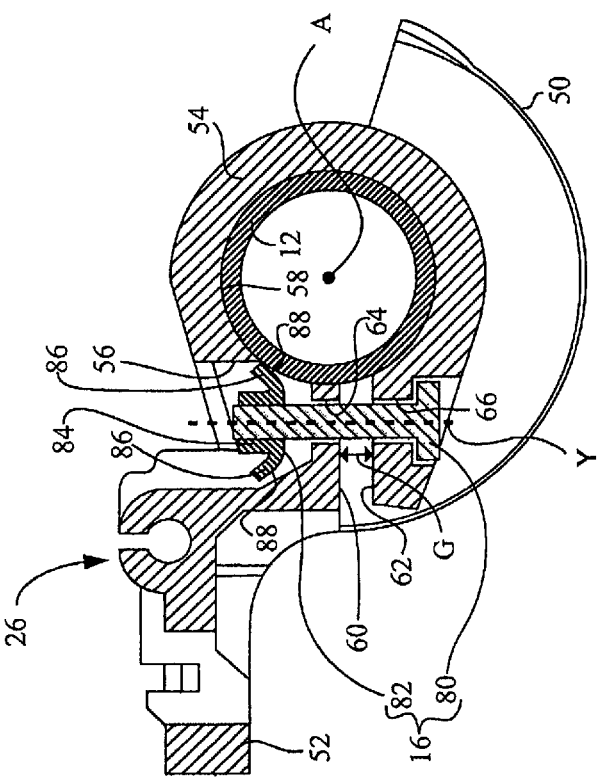
FIG. 5 is another cross-sectional view similar to FIG. 4 showing the band tightener in a tightened state within the shift control device in accordance with the first embodiment of the present invention.

With reference now to FIGS. 3, 4 and 5, a description of the band portion 26 is now provided. The band portion 26 includes an outer body 50, a cable supporting projection 52 and an inner band section 54. The inner band section 54 is configured to at least partially extend around the handlebar 12 and includes two recesses 55 (FIG. 3 only), a recess 56, an inner surface 58, a first end 60, a second end 62 and bores 64 and 66. As is also shown in FIGS. 4 and 5, the first end 60 and the second end 62 define a gap G therebetween.

As is shown best in FIGS. 4 and 5, the recess 56 is open to the inner surface 58 and is therefore open or exposed to the handlebar 12 when the shift control device 14 is installed on the handlebar 12. In other words, the band section 54 includes the recess 56 and the recess 56 is open to a radially inward portion of the band section 54.

The bore 64 extends from the recess 56 to the first end 60. The second bore 66 extends from the second end 62 to an outer surface of the outer body 50. The first and second bores 64 and 66 are preferably approximately axially aligned with one another when the shift control device 14 is installed on the handlebar 12.

As is indicated in FIG. 3, the projections 40 of the base member 20 insert into the two recesses 55 interlocking the base member 20 to the band portion 26 when the shift control device 14 is installed on the handlebar 12. The inner surface 58 of the band section 54 is generally annular or circular in shape and defines a central axis A that is located to approximately coaxially align with the handlebar 12 as indicated in FIGS. 4 and 5. The bores 64 and 66 extend in a direction that is generally perpendicular to the central axis A.

The cable take-up member 28 is a conventional element that is preferably made of rigid plastic. The cable take-up member 28 is configured to rotate with the idler 34 in a conventional manner. The washer 30 and the spring washer 32 are disposed between the cable take-up member 28 and the idler 34.

The spring washer 32 is dimensioned to bias the idler 34 into contact with the base member 20 in a conventional manner.

The idler 34 is an annular ring-shaped member that includes a first set of gear teeth 70 and a second set of gear teeth 72. The first set 70 are formed on an outer radial side of the idler 34 and have a pitch diameter that matches or is approximately equal to the pitch diameter $D_2$ of the hidden gear teeth 46 of the rotatable member 22. The second set of gear teeth 72 are formed on an axial end of the idler 34 and have a pitch diameter that mates with or is approximately equal to the pitch diameter $D_1$ of the gear teeth 44 of the base member 20.

The idler 34, the washer 30, the spring washer 32 and the cable take-up member 28 are all configured to rotate about the base member 20, but are concealed within the band portion 26 and the cover 36 when the shift control device 14 is fully assembled and installed on the handlebar 12.

Operation of the shift control mechanism of the shift control device 14 is conventional. Specifically, the grip member 24 and rotatable member 22 are rotated about the base member 20 by a cyclist, which in turn causes the cable take-up member 28 to rotate. More specifically, when the rotatable member 22 is rotated, the gear teeth 46 engage the gear teeth 70 on the idler 34. Engagement between the gear teeth 46 and 70 urges the idler 34 to compress the spring washer 32 and move the gear teeth 72 away from the gear teeth 44 on the base member 20. The idler 34 engages the cable take-up member 28 to tension or loosen a cable (not shown) to change chain locations and resulting gear ratios in a conventional manner. Since operation of such shift control mechanisms is conventional further description is omitted for the sake of brevity.

With reference now to FIGS. 4 and 5, a description of the band tightener 16 is now provided. The band tightener 16 is coupled to the band member 20 to tighten the band section 54 on the handlebar 12 such that a portion of the band tightener 16 contacts the handlebar 12 once the band section 54 is tightened on the handlebar 12.

The band tightener 16 basically includes a threaded fastener 80 and a threaded nut 82, with the nut 82 arranged to contact the handlebar 12. The threaded fastener 80 is installed in the bores 64 and 66 such that a threaded end of the threaded fastener 80 extends into the recess 56. Further, when installed, the threaded fastener 80 extends between the first end 60 and the second end 62. The band tightener 16 is configured such that as the threaded fastener 80 is tightened to the nut 82, the band tightener 16 couples the first and second ends 60 and 62 of the band section 64 to draw the first and second ends 60 and 62 toward one another. As a result, the gap G is diminished and the band portion 26 securely engages the handlebar 12.

As shown in FIGS. 4 and 5, the nut 82 includes a central section 84 and a pair of projections 86 that extend from the central section 84. The central section 84 includes a threaded aperture that is configured to engage the threads on the threaded fastener 80. The projections 86 include an arcuate or curved contoured portion and a generally flat outer surface 88. The projections 86 are configured to deform in response to contact with the handlebar 12 with the band section 54 tightened around the handlebar 12. The outer surface 88 of each of the projections 86 is inclined with respect to the central section 84 is such that the outer surface 88 extends through the recess 56 and tangentially contacts the handlebar 12, as shown in FIGS. 4 and 5. As the fastener 80 is tightened (FIG. 5), outer surface 88 of the projection 86 contacting the handlebar 12 deforms in response to contact with the handlebar 12 with the band section 54 tightened around the handlebar 12. Specifically, the curve between the central section 84 and the outer surface 88 give the nut 82 a resilience or spring that allows for increased application of force on the handlebar 12. The projection 86 that contacts the handlebar 12 deforms slightly in engagement with the handlebar 12, thereby ensuring a firm grip on the handlebar 12 and securing the shift control device 14 firmly on the handlebar 12.

Second Embodiment

Figure 6:
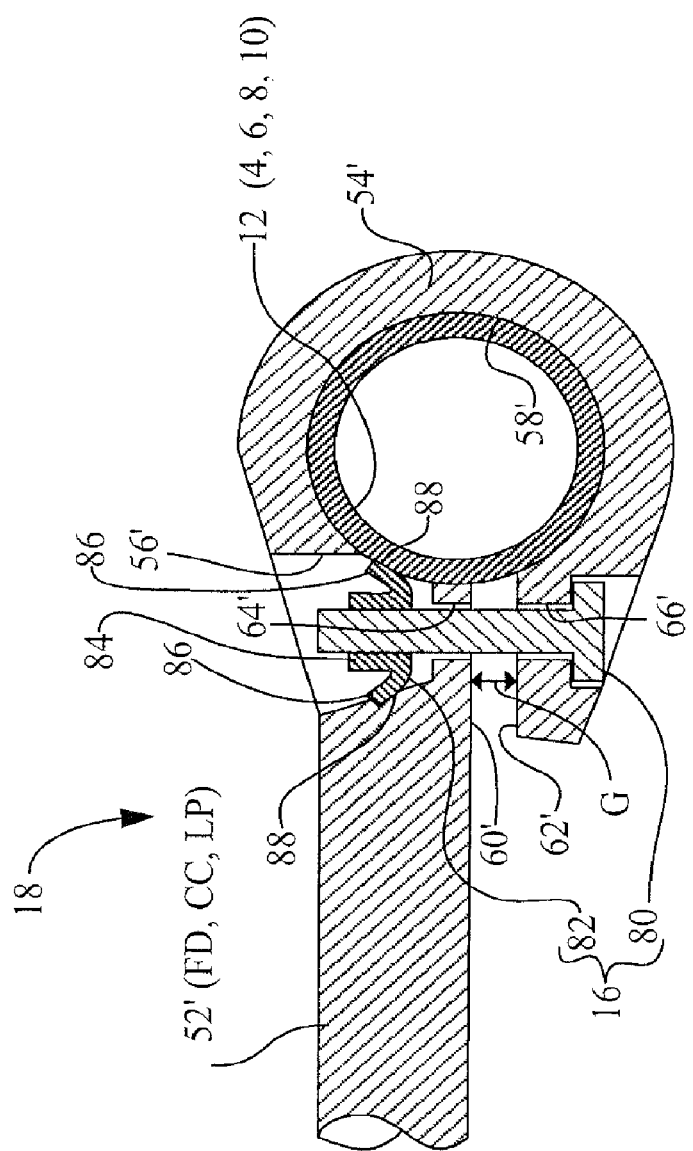
FIG. 6 is a cross-section view of the brake lever assembly taken along the line 6-6 in FIG. 2 showing a band tightener in a tightened state in accordance with a second embodiment of the present invention.

Referring now to FIG. 6, the band tightener 16 used with the brake lever assembly 18 shown in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (') or be given a new reference numeral.

As shown in FIG. 6, the band tightener 16 is configured to tighten a band section 54' of the brake lever assembly 18. The brake lever assembly 18 basically includes a lever supporting portion 52', the band section 54', a recess 56' an inner surface 58', a first end 60' and a second end 62'. The first end 60' includes a bore 64' and the second end 62' includes a bore 66'.

The band tightener 16 is identical to the band tightener 16 of the first embodiment and includes the threaded fastener 80 and the threaded nut 82, with the nut 82 again being arranged to contact the handlebar 12. The threaded fastener 80 is installed in the bores 64' and 66' such that the threaded end of the threaded fastener 80 extends into the recess 56'. Further, when installed, the threaded fastener 80 extends between the first end 60' and the second end 62'. The band tightener 16 is configured such that as the threaded fastener 80 is tightened to the nut 82, the band tightener 16 couples the first and second ends 60' and 62' of the band section 54' to draw the first and second ends 60' and 62' toward one another.

It should be understood from the drawings (as indicated in FIGS. 1 and 6) and the description herein, that the band tightener 16 can also be used in a variety of applications such as to secure the front derailleur FD to the seat tube 4, secure the cycle computer CC to the handlebar 12, and secure the lamp LP to the handlebar 12 or to the front fork 10.

It should also be understood from the drawings and description herein that the band tightener 16 can be used to mount any of a variety of bicycle components to various bicycle frame portions, including a handlebar.

GENERAL INTERPRETATIONS OF TERMS

In understanding the scope of the present invention, the term "configured" as used herein to describe a component, section or part of a device includes hardware that is constructed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle component mounting structure comprising:
  a bicycle component;
  a band coupled to the component and configured to partially extend around a bicycle frame portion having a tubular shaped outer surface, the band having a first end and a second end spaced apart from one another with the band extending partially around the bicycle frame portion; and
  a band tightener extending between the first end and the second end to tighten the band on the bicycle frame portion by drawing the first end and the second end toward one another, a portion of the band tightener including a contact surface oriented such that the contact surface tangentially contacts the tubular shaped surface of the bicycle frame portion with the band tightened on the bicycle frame portion.

2. The bicycle component mounting structure as set forth in claim 1, wherein
  the portion of the band tightener is configured to deform in response to contact with the bicycle frame portion with the band tightened around the bicycle frame portion.

3. The bicycle component mounting structure as set forth in claim 1, wherein
  the band has a first end and a second end defining a gap therebetween with the band tightener coupled between the first and second ends of the band to draw the first and second ends of the band toward one another.

4. The bicycle component mounting structure as set forth in claim 1, wherein
the band tightener includes a threaded fastener and a threaded nut, the nut being arranged to contact against the bicycle frame portion.

5. The bicycle component mounting structure as set forth in claim 4, wherein
the band includes a central axis located to approximately coaxially align with the bicycle frame portion and a bore extending in a direction generally perpendicular to the central axis, with the threaded fastener disposed within the bore.

6. The bicycle component mounting structure as set forth in claim 5, wherein
the nut comprises a central section and at least one projection extending from the central section, the contact surface being formed on the projection.

7. The bicycle component mounting structure as set forth in claim 6, wherein
the projection is inclined with respect to the central section such that the contact surface tangentially contacts the bicycle frame portion.

8. The bicycle shift control device as set forth in claim 6, wherein
the projection is configured to deform in response to contact between the contact surface and the bicycle frame portion with the band tightened around the bicycle frame portion.

9. The bicycle component mounting structure as set forth in claim 4 wherein
the band includes a recess that is open to a radially inward portion of the band with the nut disposed within the recess.

10. The bicycle component mounting structure as set forth in claim 4 wherein
the nut comprises a central threaded section and at least one deformable projection extending from the central threaded section.

11. The bicycle component mounting structure as set forth in claim 1 wherein
the bicycle frame portion is a handlebar.

12. The bicycle component mounting structure as set forth in claim 1 wherein
the bicycle frame portion is a seat tube.

13. The bicycle component mounting structure as set forth in claim 1 wherein
the bicycle frame portion is a front fork.

14. The bicycle component mounting structure as set forth in claim 1 wherein
the bicycle component is a shift control mechanism.

15. The bicycle component mounting structure as set forth in claim 1 wherein
the bicycle component is a lamp.

16. The bicycle component mounting structure as set forth in claim 1 wherein
the bicycle component is a derailleur.

17. A bicycle component mounting structure comprising:
a bicycle component;
a band coupled to the component and configured to at least partially extend around a bicycle frame portion, the band including a central axis located to approximately coaxially align with the bicycle frame portion and a bore extending in a direction generally perpendicular to the central axis; and
a band tightener coupled to the band to tighten the band on the bicycle frame portion, the band tightener including a threaded fastener and a threaded nut, the threaded fastener disposed within the bore of the band, the nut including a central section and at least one projection extending from the central section, the projection having a contact surface that is inclined with respect to the central section such that the contact surface of the projection tangentially contacts the bicycle frame portion with the band tightened on the bicycle frame portion.

18. A bicycle component mounting structure comprising:
a bicycle component;
a band coupled to the component and configured to at least partially extend around a bicycle frame portion, the band including a central axis located to approximately coaxially align with the bicycle frame portion and a bore extending in a direction generally perpendicular to the central axis; and
a band tightener coupled to the band to tighten the band on the bicycle frame portion, the band tightener including a threaded fastener and a threaded nut, the threaded fastener disposed within the bore of the band, the nut including a central section and at least one projection extending from the central section, the projection having a contact surface, the projection being configured to deform in response to tangential contact between the contact surface and the bicycle frame portion with the band tightened around the bicycle frame portion.

* * * * *

(12) EX PARTE REEXAMINATION CERTIFICATE (9133rd)
United States Patent
Kua et al.

(10) Number: US 7,757,582 C1
(45) Certificate Issued: Jul. 10, 2012

(54) BICYCLE COMPONENT MOUNTING STRUCTURE

(75) Inventors: Wei Hock Kua, Singapore (SG); Aik Kwang Ng, Singapore (SG)

(73) Assignee: Shimano (Singapore) Pte. Ltd., Jurong Town (SG)

Reexamination Request:
No. 90/011,360, Nov. 30, 2010

Reexamination Certificate for:
Patent No.: 7,757,582
Issued: Jul. 20, 2010
Appl. No.: 11/641,905
Filed: Dec. 20, 2006

(51) Int. Cl.
*B62K 21/18* (2006.01)
*B62K 23/00* (2006.01)

(52) U.S. Cl. ..................................................... 74/551.8

(58) Field of Classification Search ............... 248/230.1, 248/230.6; 74/551
See application file for complete search history.

(56) References Cited

To view the complete listing of prior art documents cited during the proceeding for Reexamination Control Number 90/011,360, please refer to the USPTO's public Patent Application Information Retrieval (PAIR) system under the Display References tab.

*Primary Examiner* — Robert M. Fetsuga

(57) ABSTRACT

A bicycle component includes a band and a band tightener. The band is configured to at least partially extend around a bicycle frame portion. The band tightener is coupled to the band to tighten the band on the bicycle frame portion such that a portion of the band tightener contacts the bicycle frame portion with the band tightened on the bicycle frame portion.

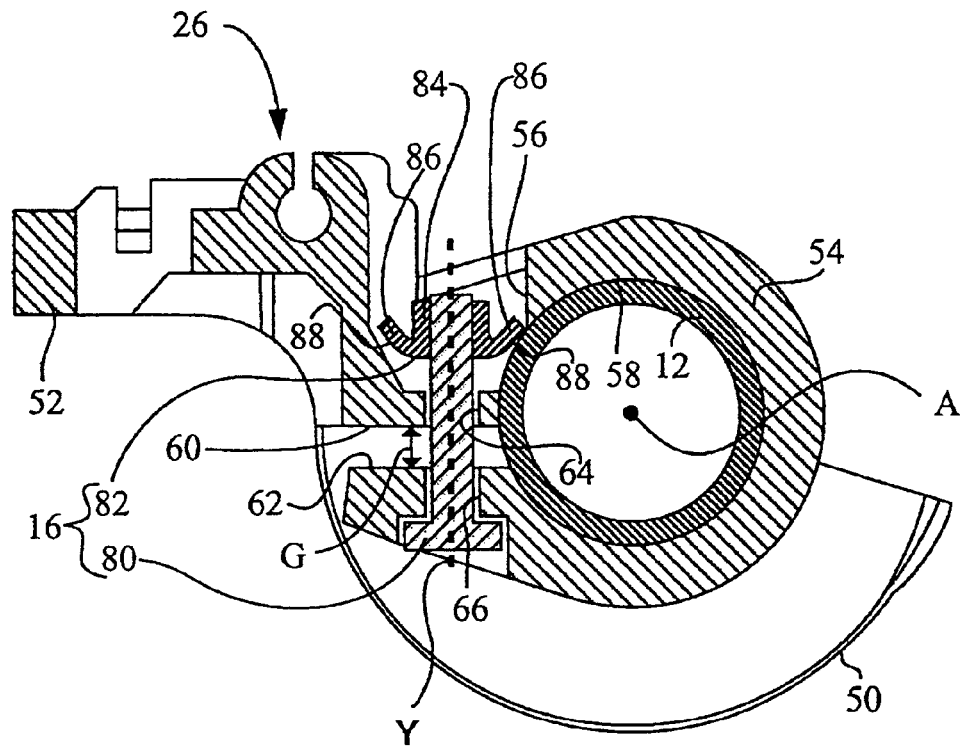

(Amended)

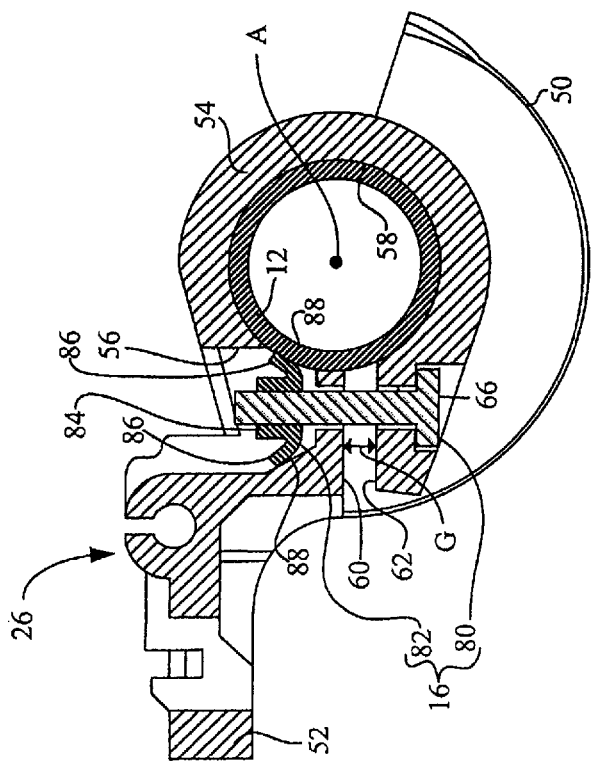
Fig. 4 (Amended)

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 54-65:

The band tightener 16 basically includes a threaded fastener 80 and a threaded nut 82, with the nut 82 arranged to contact the handlebar 12. The threaded fastener 80 is installed in the bores 64 and 66 such that a threaded end of the threaded fastener 80 extends into the recess 56. Further, when installed, the threaded fastener 80 extends between the first end 60 and the second end 62. *Thus, the threaded fastener 80 has a central longitudinal axis Y, and the first and second ends 60 and 62 of the band section 64 are disposed axially between the threaded nut 82 and a head of the threaded fastener 80 with respect to the central longitudinal axis Y when installed. As such, the threaded nut 82 and the head of the threaded fastener 80 are disposed axially outward of the first and second ends 60 and 62 with respect to the central longitudinal axis Y of the threaded fastener 80.* The band tightener 16 is configured such that as the threaded fastener 80 is tightened to the nut 82, the band tightener 16 couples the first and second ends 60 and 62 of the band section 64 to *squeeze and thereby* draw the first and second ends 60 and 62 toward one another. As a result, the gap G is diminished and the band portion 26 securely engages the handlebar 12.

THE DRAWING FIGURES HAVE BEEN CHANGED AS FOLLOWS:

In FIG. 4 longitudinal axis Y added.

AS A RESULT OF REEXAMINATION, IT HAS BEEN DETERMED THAT:

The patentability of claim 18 is confirmed.

Claims 1-4, 8, 9 and 11-17 are determined to be patentable as amended.

Claims 5-7 and 10, dependent on an amended claim, are determined to be patentable.

New claims 19 and 20 are added and determined to be patentable.

1. A bicycle component mounting structure comprising:
   a bicycle component;
   a band coupled to the component and configured to partially extend around a bicycle frame portion having a tubular shaped outer surface, the band having a first end and a second end spaced apart from one another with the band extending partially around the bicycle frame portion; and
   a band tightener extending between the first end and the second end to tighten the band on the bicycle frame portion by drawing the first end and the second end toward one another, a portion of the band tightener including a contact surface oriented such that the contact surface tangentially contacts the tubular shaped surface of the bicycle frame portion with the band tightened on the bicycle frame portion,
   *the band tightener including a threaded fastener and a threaded nut that includes the contact surface, the band having a first end and a second end defining an adjustable gap therebetween, the first and second ends of the band being disposed axially between the threaded nut and a head of the threaded fastener with respect to a central longitudinal axis of the threaded fastener, and the threaded fastener and the threaded nut being arranged to squeeze the first and second ends together to adjust a size of the adjustable gap.*

2. [The] *A* bicycle component mounting structure [as set forth in claim 1, wherein] *comprising:*
   *a bicycle component;*
   *a band coupled to the component and configured to partially extend around a bicycle frame portion having a tubular shaped outer surface, the band having a first end and a second end spaced apart from one another with the band extending partially around the bicycle frame portion; and*
   *a band tightener extending between the first end and the second end to tighten the band on the bicycle frame portion by drawing the first end and the second end toward one another, a portion of the band tightener including a contact surface oriented such that the contact surface tangentially contacts the tubular shaped surface of the bicycle frame portion with the band tightened on the bicycle frame portion,*
   the portion of the band tightener [is] *being* configured to deform in response to contact [with] *between the contact surface and* the bicycle frame portion with the band tightened around the bicycle frame portion.

3. The bicycle component mounting structure as set forth in claim [1] *2*, wherein
   the band has a first end and a second end defining a gap therebetween with the band tightener coupled between the first and second ends of the band to draw the first and second ends of the band toward one another.

4. The bicycle component mounting structure as set forth in claim [1] *2*, wherein
   the band tightener includes a threaded fastener and a threaded nut, the nut being arranged to contact against the bicycle frame portion.

8. [The] *A* bicycle [shift control device as set forth in claim 6, wherein] *component mounting structure comprising:*
   *a bicycle component;*
   *a band coupled to the component and configured to partially extend around a bicycle frame portion having a tubular shaped outer surface, the band having a first end and a second end spaced apart from one another with the band extending partially around the bicycle frame portion; and*
   *a band tightener extending between the first end and the second end to tighten the band on the bicycle frame portion by drawing the first end and the second end toward one another, a portion of the band tightener including a contact surface oriented such that the con-* tact surface tangentially contacts the tubular shaped surface of the bicycle frame portion with the band tightened on the bicycle frame portion, the band tightener including a threaded fastener and a threaded nut, the nut being arranged to contact against the bicycle frame portion, the band including a central axis located to approximately coaxially align with the bicycle frame portion and a bore extending in a direction generally perpendicular to the central axis, with the threaded fastener disposed within the bore, the nut comprising a central section and at least one projection extending from the central section, the contact surface being formed on the projection, and the projection [is] *being* configured to deform in response to contact between the contact surface and the bicycle frame portion with the band tightened around the bicycle frame portion.

9. [The] *A* bicycle component mounting structure [as set forth in claim 4 wherein] *comprising:* a bicycle component;

a band coupled to the component and configured to partially extend around a bicycle frame portion having a tubular shaped outer surface, the band having a first end and a second end spaced apart from one another with the band extending partially around the bicycle frame portion; and a band tightener extending between the first end and the second end to tighten the band on the bicycle frame portion by drawing the first end and the second end toward one another, a portion of the band tightener including a contact surface oriented such that the contact surface tangentially contacts the tubular shaped surface of the bicycle frame portion with the band tightened on the bicycle frame portion, the band tightener including a threaded fastener and a threaded nut, the nut being arranged to contact against the bicycle frame portion, the band [includes] *including* a recess that is open to a radially inward portion of the band with the nut disposed within the recess.

11. The bicycle component mounting structure as set forth in claim [1] *2* wherein the bicycle frame portion is a handlebar.

12. The bicycle component mounting structure as set forth in claim [1] *2* wherein the bicycle frame portion is a seat tube.

13. The bicycle component mounting structure as set forth in claim [1] *2* wherein the bicycle frame portion is a front fork.

14. The bicycle component mounting structure as set forth in claim [1] *2* wherein the bicycle component is a shift control mechanism.

15. The bicycle component mounting structure as set forth in claim [1] *2* wherein the bicycle component is a lamp.

16. The bicycle component mounting structure as set forth in claim [1] *2* wherein the bicycle component is a derailleur.

17. A bicycle component mounting structure comprising:

a bicycle component;

a band coupled to the component and configured to at least partially extend around a bicycle frame portion, the band including a central axis located to approximately coaxially align with the bicycle frame portion and a bore extending in a direction generally perpendicular to the central axis; and a band tightener coupled to the band to tighten the band on the bicycle frame portion, the band tightener including a threaded fastener and a threaded nut, the threaded fastener disposed within the bore of the band, the nut including a central section and at least one projection extending from the central section, the projection having a *generally flat* contact surface that is inclined with respect to the central section such that the contact surface of the projection tangentially contacts the bicycle frame portion with the band tightened on the bicycle frame portion.

*19. The bicycle component mounting structure as set forth in claim 18 wherein*

*the band having a first end and a second end defining an adjustable gap therebetween, the threaded nut and a head of the threaded fastener being disposed axially outward of the first and second ends of the band with respect to a central longitudinal axis of the threaded fastener such that the threaded fastener and the threaded nut are arranged to squeeze the first and second ends together to adjust a size of the adjustable gap.*

*20. The bicycle component mounting structure as set forth in claim 17 wherein*

*the band has a first end and a second end defining an adjustable gap therebetween, the threaded nut and a head of the threaded fastener being disposed axially outward of the first and second ends of the band with respect to a central longitudinal axis of the threaded fastener such that the threaded fastener and the threaded nut are arranged to squeeze the first and second ends together to adjust a size of the adjustable gap.*

\* \* \* \* \*